July 21, 1970          J. P. LIMON          3,521,264
MONITORING DEVICE FOR ELECTRICAL LOADS
Filed Sept. 11, 1967
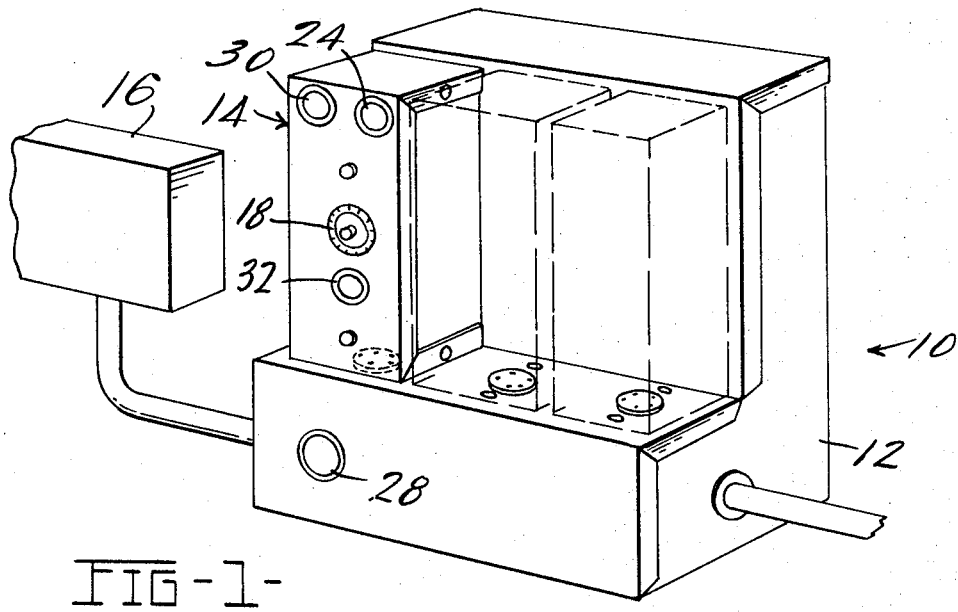
FIG-1-
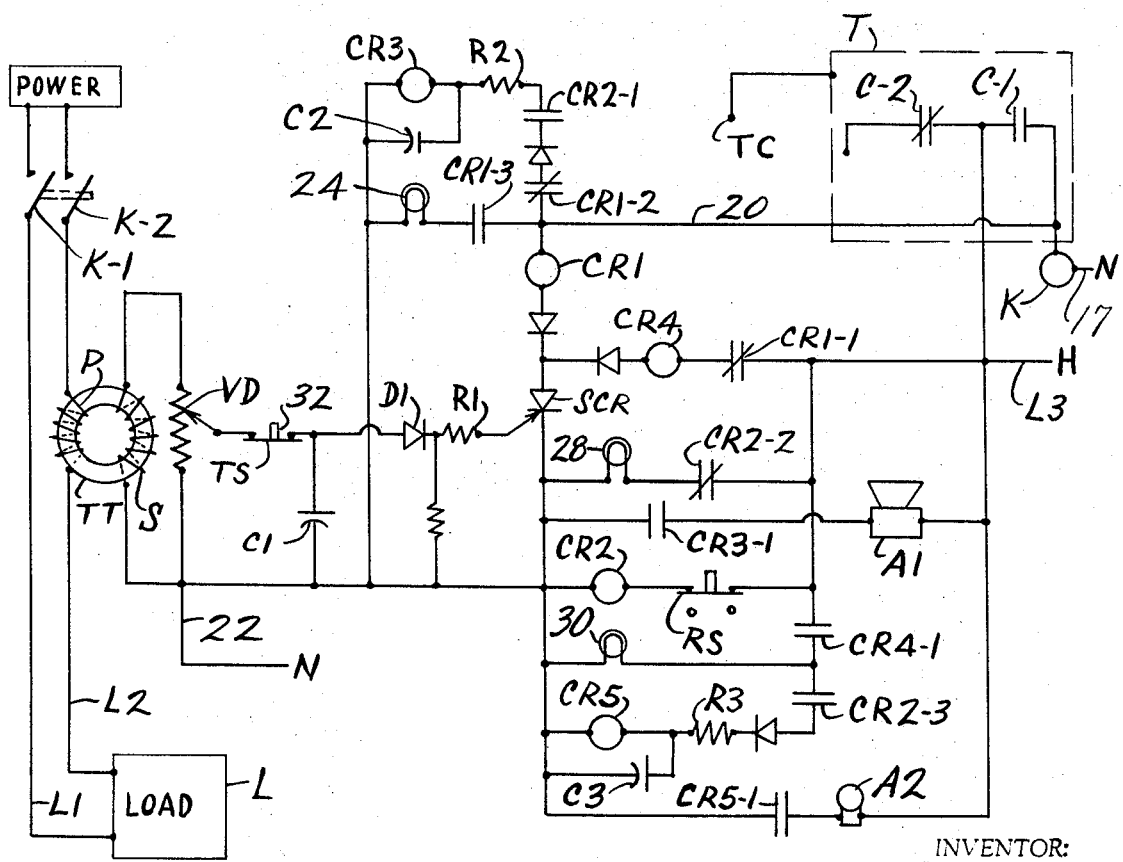
FIG-2-
INVENTOR:
JOSE P. LIMON.
BY
ATT'YS.

3,521,264
MONITORING DEVICE FOR ELECTRICAL LOADS
Jose P. Limon, Rossford, Ohio, assignor to Harold H. Kowalka, Perrysburg, Ohio
Filed Sept. 11, 1967, Ser. No. 666,841
Int. Cl. G08b 21/00
U.S. Cl. 340—253                  5 Claims

ABSTRACT OF THE DISCLOSURE

A monitoring device is especially designed to indicate a malfunction in the operation of electrical heating elements as used in plastic extruders or furnaces. The device is capable of detecting a failure of any one of the electrical heating elements to function and also a failure of any heating element to shut off at a desired time. The device is supplied in a compact, modular unit capable of monitoring several zones in an extruder or furnace.

---

This invention relates to a monitoring device for electrical loads and particularly to such a device capable of detecting malfunctioning in electrical heating systems.

In some electrical heating systems as employed in electrically-heated ovens or other heat-treating furnaces for example, it is not uncommon for an electrical heating element in the heating chamber to burn out and not be detected for a long period of time. In the case of such a burn-out, the furnace takes a longer time to reach temperature after being cooled down, but this is often unnoticed by the operator. Because of the longer time required to reach operating temperature, the furnace consumes excess power, as a result of heat loss, and also has a greater amount of downtime. In the event a heating element burns out in a plastic extruder, results are more serious, in that the plastic material being extruded is not properly heated and will be excessively brittle or have other undesirable properties.

The present invention provides a monitoring device which is capable of immediately giving a signal in the event a heating element burns out or a fuse blows. The device is of a compact design and contains modular units which can be easily and quickly replaced. The device is also readily adaptable for any required number of zones of a furnace, for example, in which the heating elements are located.

The monitoring device is capable of detecting a malfunction of the type in which the heating element switches do not open at the proper time. Where this type of malfunction occurs, of course, the results can be most serious, producing excessively high temperatures which may cause permanent damage to the furnace or extruder as well as cause a serious fire hazard.

It is, therefore, a principal object of the invention to provide an improved monitoring device for systems employing electrical heating elements.

Another object of the invention is to provide a monitoring device of compact, reliable, flexible design for an electrical heating system.

A further object of the invention is to provide a monitoring device for an electrical heating system capable of detecting the failure of any electrical heating element to operate.

Still another object of the invention is to provide a monitoring device for an electrical heating system capable of detecting the continued operation of an electrical heating element when heat is no longer required.

Various other objects and advantages of the invention will be aparent from the following detailed description of a preferred embodiment thereof, reference being made to the accompanying drawing, in which:

FIG. 1 is a somewhat schematic view in perspective of a monitoring device embodying the invention in combination with an electrical heating system;

FIG. 2 is a diagrammatic view of the electrical circuitry of the system and monitoring device shown in FIG. 1.

Referring to FIG. 1, a monitoring device embodying the invention is indicated at 10 and includes a base housing 12 having, in this instance, three monitoring units 14 for each of three zones of a furnace 16, only one unit being shown in detail. The number of the units 14 will depend upon the number of elements or zones in the furnace with the number being increased or decreased relatively easily for a particular installation.

Referring to FIG. 2, a load designated L can be a single heating element, for example, or a plurality of heating elements in one zone of a furnace. The load L is supplied with power through lines L1 and L2 with the power to the load being controlled through contactor switches or contacts K–1 and K–2. The contactor contacts are closed when a contactor K is energized, which occurs when the chamber or extruder in which the load L is located requires heat. This is determined by a suitable temperature-sensing instrument or unit designated T having a temperature-sensing element such as a thermocouple TC associated with the apparatus being heated. When the apparatus requires heat, normally-open contacts C–1 close and normally-closed contacts C–2 open so that the contactor is energized through a power line L3 and a neutral or ground line 17. When the contactor K is closed, the contacts K–1 and K–2 are closed to supply power to the load.

A toroidal transformer TT is located in association with the line L2 to sense the current flowing therethrough. Other forms of current or power sensing devices can be employed, if desired. In this instance, the line L2 forms a helical coil constituting a primary P of the toroidal transformer with the sensitivity of the transformer being determined, at least in part, by the number of turns in the primary. A voltage is induced in a secondary S connected with which is a variable voltage divider VD which can be controlled by external shaft 18, as shown in FIG. 1. Voltage is applied through a diode D1 and a resistor R1 to a gate of a silicon controlled rectifier SCR with this voltage being controlled by the voltage divider to fire or key the rectifier SCR when the load is operating normally and the voltage induced in the secondary S of the transformer TT is a predetermined amount. Other voltage-sensitive switch means can be employed in place of the rectifier SCR. The gate voltage is rectified by the diode D1 to provide half-wave power to cause the rectifier SCR to be keyed or conducting and then non-conducting sixty times per second, for example, for sixty-cycle power. A capacitor C1 and the resistor R1 help absorb any sharp spikes in the voltage for protection of the rectifier SCR.

When the rectifier SCR is keyed, it completes a circuit for a control relay CR1 through the power line L3, the temperature control contacts C–1, a line 20, and a ground or neutral line 22. Normally-closed contacts CR1–1 then open to prevent energization of a control relay CR4, normally-closed contacts CR1–2 open to prevent energization of a control relay CR3, and normally-open contacts CR1–3 close to light a fuse and heater indicator signal or light 24 by completing a circuit through the line L3, the temperature control contacts C–1, the line 20, and the neutral line 22. When the light 24 is lit, it indicates that the load is receiving power and all portions thereof are functioning normally.

The transformer TT and the voltage divider VD can be arranged to control the current quite closely so that even a small drop in current in the lines L1 and L2 will cause the rectifier SCR to drop out. By way of example, the load may constitute five heaters carrying one ampere each in which instance the system is set to sense a current drop of one ampere. In another situation, ten heaters might be employed carrying five amperes each, in which instance a current drop of five amperes would cause the rectifier SCR to drop out. When the light 24 is out and the temperature unit T is calling for heat, it immediately indicates to the operator that one of the elements is not functioning or that the fuse therefor is blown. Since each of the units 14 employs one of the lights 24, the zone in which the problem occurs is immediately known, too.

In addition to the light 24 indicating the zone in which the heater malfunction occurs, an audible signal also is established to immediately draw the attention of an operator to the malfunction even though he is in a remote location. When hearing the sound signal, the operator can approach the monitoring device and tell from the extinguished one of the lights 24 in which zone the problem exists. Accordingly, a control relay CR2 is energized whenever the monitoring device is operative, through the power line L3 and the neutral or ground line 22. With the relay CR2 energized, its contacts CR2–1 close, these contacts being in series with the normally-closed contacts CR1–2. When the relay CR2 is energized and the relay CR1 is de-energized, with the instrument T calling for heat, a relay CR3 is energized. A short delay, e.g. one second, is established before the relay CR3 is energized, by means of a resistor R2 and a capacitor C2. The relay CR3 then closes its contacts CR3–1 in series with an audible signal or alarm A1. The signal A1 is located in the base housing 12 to serve all zones.

A reset switch RS is located in series with the relay CR2 and is of the "push-push" type. When the switch is first pushed, it is opened, and when pushed a second time, it is closed. When the switch is opened, the relay CR2 is de-energized and its contacts CR2–1 open to de-energize the relay CR3. This opens the contacts CR3–1 and shuts off the alarm A1. At the same time, contacts CR2–2 open to extinguish an "alarm off" light 28 which indicates to the operator that the monitoring circuit is not functioning for that particular zone. However, the other two zones in this instance are connected with the alarm A1 and would operate it, should the occasion arise. The "alarm off" light 28 is located on the base below each of the units. The use of the reset switch RS enables an operator to shut off the audible alarm in the event that the malfunctioning element cannot be replaced immediately. The indicator light 24 and the "alarm off" light 28 still remain extinguished to show that a problem exists. When repair has been made and the switch RS is pushed a second time to close it, the unit again functions normally with the relay CR2 again energized.

If the contactor contacts K–1 and K–2 fail to open when the furnace 16 is at temperature, another signal is produced by the monitoring device. When the temperature sensing unit no longer calls for heat, the contacts C–1 again open. If the contactor contacts fail to open and power is still supplied to the lines L1 and L2, the rectifier SCR will still be keyed although the light 24 will be off and the control relay CR1 will not be energized since the contacts C–1 are open. Contacts CR1–1 are then closed enabling the relay CR4 to be energized through the line L3, the rectifier SCR and the line 22. The relay CR4 closes its normally-open contacts CR4–1 in series with contacts CR2–3 which are closed when the monitoring system is operating, thereby energizing a relay CR5. Energization of this relay also has a short delay, e.g. one second, achieved through a capacitor C3 and a resistor R3. The relay CR5 then closes its contacts CR5–1 to energize another audible signal or alarm A2 also located in the base housing 12. Because of the danger of possible overheating and damage, the alarm A2 has no reset switch so that the alarm A2 will sound until the contactor contacts K–1 and K–2 are opened. When the relay CR5 is energized, a malfunction light 30 also in the unit 14 lights to indicate in which of the zones the contactor contacts are sticking.

The relays CR1 and CR4 preferably are of a commercial type having copper washers across the coils which hold the E.M.F., preventing the relays from dropping out due to the on-off nature of the rectifier SCR. Such relays can be obtained under the trade name "Ohmite." Otherwise, capacitors can be used across the coils to hold them in throughout the intermittent operation of the rectifier.

A test switch TS, having a button 32 in the lower part of the unit 14, can be opened to enable the operator to determine if the alarm A1 is functioning.

Many modifications of the above described embodiment of the invention, and particularly variations in the specific circuit shown, will be apparent to those skilled in the art, and it is to be understood that such modifications can be made without departing from the scope of the invention, if they are within the spirit and the tenor of the accompanying claims.

I claim:

1. A monitoring system for monitoring an electrical heating load comprising a plurality of heating elements in a plurality of zones of an apparatus to be heated, power supply means for supplying power to the heating elements in said zones, a temperature-sensing element for each of said zones, means responsive to each of said temperature-sensing elements for controlling supply of power from said power supply means to the heating element of the associated zone, said monitoring system comprising a base housing, a plurality of monitoring units, one for each of said zones, electrically connected with said base housing, each of said monitoring units having a first signal and electrical means to operate said first signal in a manner to indicate when the temperature-sensing element indicates heat is required and the heating element of the associated zone is receiving power from said power supply, said base housing having an audible signal, means connected between said audible signal and each of said monitoring units for operating said audibile signal when the first signal of any one of said monitoring units indicates a malfunction, each of said monitoring units further having a second signal, and each of said monitoring units having means for causing said second signal to operate when the associated heating element of the associated zone is receiving power from said power supply means and the temperature-sensing element is not calling for heat.

2. A monitoring system for determining a malfunction in an electrical heating system employing a plurality of heating elements wherein each element uses a predetermined amount of current under normal operation, said system including control means including temperature-sensing means for controlling operation of each heating element, said monitoring system comprising means for producing a voltage responsive to the current supplied to each of said heating elements, voltage sensitive switch means operable at a predetermined voltage level, means connecting said switch means and said voltage producing means to cause said switch means to assume one condition at the predetermined voltage level and another condition below the predetermined voltage level, first signal means for each element and electrically associated with said switch means to produce a first signal when the associated temperature-sensing means calls for heat and power is supplied to the associated heating element, second signal means associated with said switch means and operable when the associated temperature-sensing means is not calling for heat and the voltage sensed by said voltage-sensitive switch means is at least at the predetermined level to indicate that the associated heating element is being supplied power, and audibile signal means associated with said switch means and operable when any one of the temperature-sensing means is calling for heat and the associated heating element is not being supplied power and the associated first signal means is not operating.

3. A system according to claim 2 characterized by a control relay energized by said voltage-sensitive switch means, said control relay having contacts in series with the first signal means for closing and enabling said signal means to operate when said control relay is energized, said means responsive to said temperature-sensing element rendering said control relay inoperative even when the voltage is above the predetermined level, a second control relay, said first control relay having a set of normally-closed contacts associated with the second control relay whereby said second control relay is energized when the voltage is at least at the predetermined level and said first control relay is de-energized, said second control relay having contacts associated with the second signal means for operating said second signal means when said second control relay is energized.

4. A system according to claim 3 characterized further by second audible signal means operable when any one of the temperature-sensing means is not calling for heat and the associated heating element is receiving power and the associated second signal means is operating.

5. A monitoring system according to claim 1 characterized further by a second audible signal associated with said base housing, and means connecting said second audible signal with each of said monitoring units to cause said second audible signal to operate when any one of said second signals is operated.

References Cited
UNITED STATES PATENTS

| | | | |
|---|---|---|---|
| 2,516,570 | 7/1950 | Hartwig et al. | 219—425 |
| 2,748,380 | 5/1956 | Platte et al. | 340—248 |
| 2,828,450 | 3/1958 | Pinckaers | 340—233 |
| 3,249,929 | 5/1966 | Sillers | 340—248 |
| 3,277,460 | 10/1966 | Heckman | 340—253 |
| 3,283,579 | 11/1966 | Josephs | 340—228 |
| 3,304,441 | 2/1967 | Pelt | 340—233 |
| 3,334,341 | 8/1967 | Green | 340—248 |
| 3,419,214 | 12/1968 | Evalds | 340—233 |

JOHN W. CALDWELL, Primary Examiner

D. MYER, Assistant Examiner

U.S. Cl. X.R.

340—256, 409